United States Patent [19]
Honeycutt

[11] Patent Number: 5,575,443
[45] Date of Patent: Nov. 19, 1996

[54] QUICK RELEASE ACCESSORY MOUNT ON A BICYCLE

[76] Inventor: Jay W. Honeycutt, 244 Madison Ave., #182, New York, N.Y. 10016

[21] Appl. No.: 322,412

[22] Filed: Oct. 4, 1994

[51] Int. Cl.⁶ .................................................. A47F 5/08
[52] U.S. Cl. ................... 248/231.9; 248/314; 280/288.4
[58] Field of Search .......................... 248/231.9, 231.91, 248/314, 224.3, 552; 224/30 R, 32 R, 35, 32 A, 39, 908; 280/288.1, 288.4

[56] References Cited

U.S. PATENT DOCUMENTS

| | | | |
|---|---|---|---|
| 2,010,479 | 8/1935 | Dennis | 224/32 R |
| 2,589,497 | 3/1952 | Jette | 224/35 |
| 4,022,488 | 5/1977 | Likas | 280/288.4 |
| 4,053,091 | 10/1977 | Martelet | 224/32 A |
| 4,157,075 | 6/1979 | Kirvutza | 116/56 |
| 4,502,705 | 3/1985 | Weaver | 280/231 |
| 4,542,839 | 9/1985 | Levine et al. | 224/36 |
| 4,966,382 | 10/1990 | Giles | 280/288.4 |
| 5,303,944 | 4/1994 | Kalmus | 280/288.4 |
| 5,353,973 | 10/1994 | McMurtrey | 224/36 |
| 5,406,816 | 4/1995 | Thomas | 224/30 A |

*Primary Examiner*—Karen J. Chotkowski
*Assistant Examiner*—Anita M. King

[57] ABSTRACT

A quick release mount and various cooperatively structured accessories providing a bicycle with structuring for the ready attachment and detachment of a wide variety of the accessories such as cargo platforms and baskets, child seats and video/camera mounts and the like. The mount includes a first mount member or portion secured to a bike such as in an end of a tube of the bike frame or a tube attachable to the bike and left in place after attachment. A second mount member or portion of each accessory is interconnectable with the first mount member. A lock member preferably utilizing spring ball detents on a lock pin shaft is utilized to releasably interlock the first and second mount members together to prevent unwanted separation. The lock member is manually disengagable preferably with a disengagement push button to allow wanted separation of the first and second mount members for rapid and simple swapping of one accessory with another. With the exception of the human hand, no tools are required to quickly replace one accessory such as a cargo basket having a second mount member affixed thereto with another accessory such as a child's seat having an identical second mount member affixed thereto. Registration structuring preferably including male and female interconnects is provided to allow quick and simple horizontal or vertical placement of an accessory during attachment thereof.

5 Claims, 11 Drawing Sheets

QUICK RELEASE ACCESSORY MOUNT ON A BICYCLE

BACKGROUND OF THE INVENTION

1. Field of the Invention

This invention relates to bicycles in general, and more particularly to a plurality of different functional type accessories and a standardized mount therefore attachable to a bicycle for allowing the quick interchanging of one accessory with another accessory in accordance with the present invention.

2. Description of the Prior Art

It is known that accessories such as cargo carrying baskets, racks and platforms, and second seats for children have been attached to bicycles. In the prior art, the connecting of accessory items such as baskets and child seats to bicycles has typically required significant time and the use of dedicated mounting hardware supplied by the manufacturer of the accessory and or bike and useful exclusively for that particular single accessory from that particular manufacturer. Thus, with prior art technology, primarily due to dedicated mounting hardware for a single specific accessory, a general cargo basket attached to a bicycle cannot be virtually instantly removed and replaced with another accessory item having a different function, such as a child seat for example.

It is also known that quick release clamp mechanisms, usually having handles connected to cams as components of the latch or clamp, which may be delatched absent the use of tools other than the human hand have been utilized on bicycles to allow the quick adjustment or removal of the bike seat or wheels. Additionally known is a U.S. Pat. No. 5,303,944 issued Apr. 19, 1994 to A. L. Kalmus which teaches a Bicycle Riding Training Device which utilizes a twist-lock type quick connection for removably attaching an elongated bicycle support pole to the bike so that the handle of the pole may be held to support the bike in the training of a young child learning to ride. Snap-lock and twist-lock quick connection structures are known and used in many fields.

What is not anticipated in the prior art is the combination of a quick release type coupler and mount in combination with a wide variety of cooperatively structured different functioning accessories providing a bicycle with structuring for attachment and the ready swapping of the cooperatively structured accessories such as cargo baskets, child seats, computer and camera/video equipment platforms, lights and the like, absent using hand tools such as screw drivers, socket and allen wrenches and the like. Such a standardized quick release coupled mount cooperative with a wide variety of accessories each of a different functional type and each including like or standardized mount members to allow the virtual instantaneous swapping of one accessory with another accessory of a different functional type each having standardized mount members to each other and to a mount member attached to a bicycle is believed to be highly desireable and needed.

SUMMARY OF THE INVENTION

The herein detailed description is not the only mode and structuring meeting the true invention. Clearly some changes which could be made to specifics given for example may be made absent deviating from the invention, but for the sake of briefness of this disclosure, all of these changes which could be made have not been described.

The present invention, includes structuring, herein detailed and shown in the drawings for exemplification, to allow the ready attachment and detachment of a wide variety of accessory items in accordance with the invention on a bicycle. The structuring includes a mount and a plurality of cooperatively structured mountable accessories. The accessories may be any desired item which is normally not essential to the conventional operation of the bike. Such accessories may include but by no means be limited to cargo carrying platforms and baskets, a child seat, a computer, camera/video equipment, sidecar or rear car for a passenger or cargo, lights, ice chests, thermally insulated boxes for transporting pizza and other hot or cold foods, hangers for hanging the bike from a ceiling or wall for storage, components for locking the bike to prevent theft thereof, or any other accessory one might wish to attach to the bike.

The present mount supports the present cooperatively structured accessories in a quick release manner, so that one can quickly replace an accessory such as a cargo basket with another accessory such as a child's seat on the bicycle, essentially utilizing the same standardized mounting components. The multiple member mount includes a first mount member or portion attached to the bike, and a cooperative second mount member or portion attached to the accessory, and readily completely separable from the first mount member and bike. Each accessory structured in accordance with the present invention has attached thereto what is essentially an identical second mount member or portion readily interconnectable and interlockable with the first mount member or portion which is in effect permanently attached to the bike. After the initial installation of the first mount portion to the bike, with the exception of the human hand, no additional tools such as fastener drivers (socket or allen wrenches and screw drivers) are required to quickly swap one accessory with another accessory in accordance with the invention.

The first mount portion is not dedicated to a particular single accessory in accordance with the invention, but rather, the wide variety of accessories in accordance with the invention are each structured to interconnect and interlock with the first mount portion attached to the bike, and therefore, once the first mount member is attached to the bike where it is left in place, the accessories made in accordance with the invention and each having the second mount member may be virtually instantly swapped with one another utilizing the same first portion of the mount attached to the bike. Standardization is provided between the first mount member attached on the bike and the second mount member of each of the many accessories in accordance with the present invention.

Although the first mount member may take various structural forms as long as it is sufficiently strong, reasonably inexpensive, and interconnectable and interlockable with the second mount member of the accessories, the connection between the first and second members of the mount is preferably a registration requiring or providing slip fit in conjunction with a snap or pin lock. Additionally, the multiple member mount preferably includes a transverse wall or insert secured within a terminal open end of a support tube of the bike frame or within a support tube attachable to the bike via bracket clamps, fasteners or welding. The preferred support tube which receives the insert may be attached or defined during the manufacturing of the bike, or it may be supplied as an after-market item which could connect to the bike with a clamp or bolt-on structure, or be welded in place. In one embodiment, the insert includes a main lengthwise bore and registration recess alignable with a rigid shaft of the second mount member of each accessory also having a like main lengthwise bore and extending registration pin(s) for insertion in the registration recess of the insert. The registration recess and extending pin(s) are in essence male/female interconnects. The registration pin(s) and recess are positioned to provide registration wherein the accessory would be quick and easy to properly mount and position, and unwanted axial rotation of the accessory is prevented preferably at least in part utilizing the same male/female interconnects. Preferably the insert is recessed within the support tube a short distance back from the opening, and the second mount member includes an extending shaft portion which slides within or telescopically snugly fits into the tubing so that the tubing plays an important role in strengthening and stabilizing the connection between the first and second mounts members. Preferably with the insert, a lock pin shaft having a handle at one end; a push-button at the handle end, and spring ball detent(s) opposite the handle end on the lock pin shaft is utilized in conjunction with the insert to releasably secure the first and second mount members to one another via insertion of the lock pin shaft through the aligned main lengthwise bores of the two components whereat the spring ball detent(s) snaps outward and locks the members together to prevent them from unwanted separation (parting) along a common aligned lengthwise axis, or in other words prevents withdrawal of the second mount member shaft from the support tubing of the first mount member. When properly inserted and in the proper locked position, the spring detent(s) are on the backside of the insert relatively deep within the tubing, and are of sufficient spring strength outward and of proper placement to prevent the unwanted pulling apart of the first and second mount members. The spring detent(s) may be retracted via pushing the button with a finger to allow separation of the insert (first mount member) and second mount member of the accessory for swapping accessories. With the exception of the human hand, no tools are required to quickly replace (swap) one accessory such as a cargo basket with another accessory such as a child's seat on the bicycle, provided each accessory is structured to include the second mount member interconnectable to the first mount member on the bike.

Additionally preferred is an arrangement wherein the lock pin and or a portion of the second mount member such as the shaft portion which slips within the open end of the support tube in its approach to the insert therein, cannot be fully inserted unless desired registration has occurred, or in other words, interlocking cannot occur unless proper interconnecting registration has first occurred. This prevention of full insertion of the lock pin and or a shaft portion of the second mount member would preferably and hopefully provide a noticeable signal to the human installer of a misaligned connection and hopefully prevent the improper application of a cargo platform which if improperly installed might disengage and fall to the ground. The preferred required proper interconnecting prior to full interlocking preferably is arranged to provide a visual signal to the installer of an incomplete locking of the first mount member to the second mount member. A brightly colored paint may be applied so as to only show when partial insertion or locking has occurred, and would not show upon full insertion and interlock. Additionally, when the preferred lock pin having spring detents is utilized with the preferred insert within the support tube, the spring detents preferably provide an audible snap noise and detectable snap vibration which can be felt when snapping outward on the backside of the insert within the tube, and this serves in part to inform the installer of proper and full insertion of the lock pin. The absence of the snapping noise (and vibration feel) of the spring detents when the first and second mount members are not fully interconnected and locking is attempted, serves to further alert the installer of a situation of incomplete interlocking.

With the above portion of the Summary in mind, it should be noted that certain objects of the invention may be met with numerous different structural arrangements, and thus for the sake of further clarity, the primary object of the present invention is to provide a multiple portion accessory mount with a first mount member thereof connectable to a bicycle and remaining connected thereto and in part exposed to interconnect and interlock with a second mount member of the mount attached to an accessory item, wherein a wide variety of different accessory items are provided each having the second mount member of the multiple member mount. The accessories structured in accordance with the present invention being each of different utility (function), user selectable and cooperatively structured (standardized) in the mount structure so that once the first mount member of the bike is installed, a user can use this portion to attach an accessory of his choice, and then swap accessories whenever desired, virtually instantly, and without having to acquire and utilize wrenching tools such as screw drivers, socket and allen wrenches and the like. The interconnect between the first and second members of the multiple member mount is preferably a "plug-in" or "slip fit" lockable interconnect which is of course readily lockable and unlockable, but which is very secure when in the locked mode, and preferably readily noticeable when only partially engaged and in the unlocked mode.

In achieving the aforementioned objects utilizing a multiple portion accessory mount, it is preferred for reasons of ease of use and security of the connection, that the mount portions are attachable to one another via structuring which is simple and error resistant to interconnect during the process of connecting the accessory having the second mount member to the first mount member on the bike. Structuring rendering the connection process error resistant preferably includes use of registration structure which may include use of male and female components interconnectable between the first and second members of the multiple member mount, and further, only interconnectable when the accessory is properly aligned as desired, such as near perfect horizontally or vertically positioned. Objects of the preferred error resistant structuring includes providing the user the ability to quickly mount an accessory such as a cargo or video platform horizontally when required, or a pole and flag vertically when required, preferably absent having to take significant time and measures to insure desired proper horizontal or vertical registration of the accessory. Such registration structuring is also at least in part preferably utilized to positively prevent unwanted axial rotation of the accessory relative to the first mount member on the bike, as it can be appreciated that it is undesirable to have a child's seat spin on a mount. Preferably the error resistant structuring of the mount includes providing the user with indications readily noticeable of improper and proper placement of the second mount member to the first mount member during the interconnecting process, with this being to help prevent unwanted and unnoticed partial engagement which might lead to undesired disengagement of the accessory from the bike.

Another object of the invention is to achieve many or all of the aforementioned objects in a reasonably simple and inexpensive mount, being quite simple to use and relatively inexpensive to manufacture. To this end, it is desired to maintain the number of components low while still providing sufficient strength, and utilize components such as registration components also as positive anti-axial rotation components.

A further object of the invention is to achieve many or all of the aforementioned objects wherein structuring of the invention lends itself to being applied at the time of the initial manufacturing of a bicycle, or as an after-market or add-on attachment which bicyclists may purchase in kit form and attach to their existing previously manufactured bicycles.

A further object of the invention is to achieve many or all of the aforementioned objects wherein structuring of the invention is reasonably aesthetically pleasing, and does not substantially subtract from the appearance of the bicycle, or interfere with the normal operation of the bicycle.

These, as well as other objects and advantages will become increasingly understood and appreciated with continued reading and with a review of the attached drawings.

BEST MODES FOR CARRYING OUT THE INVENTION

Figure 1:
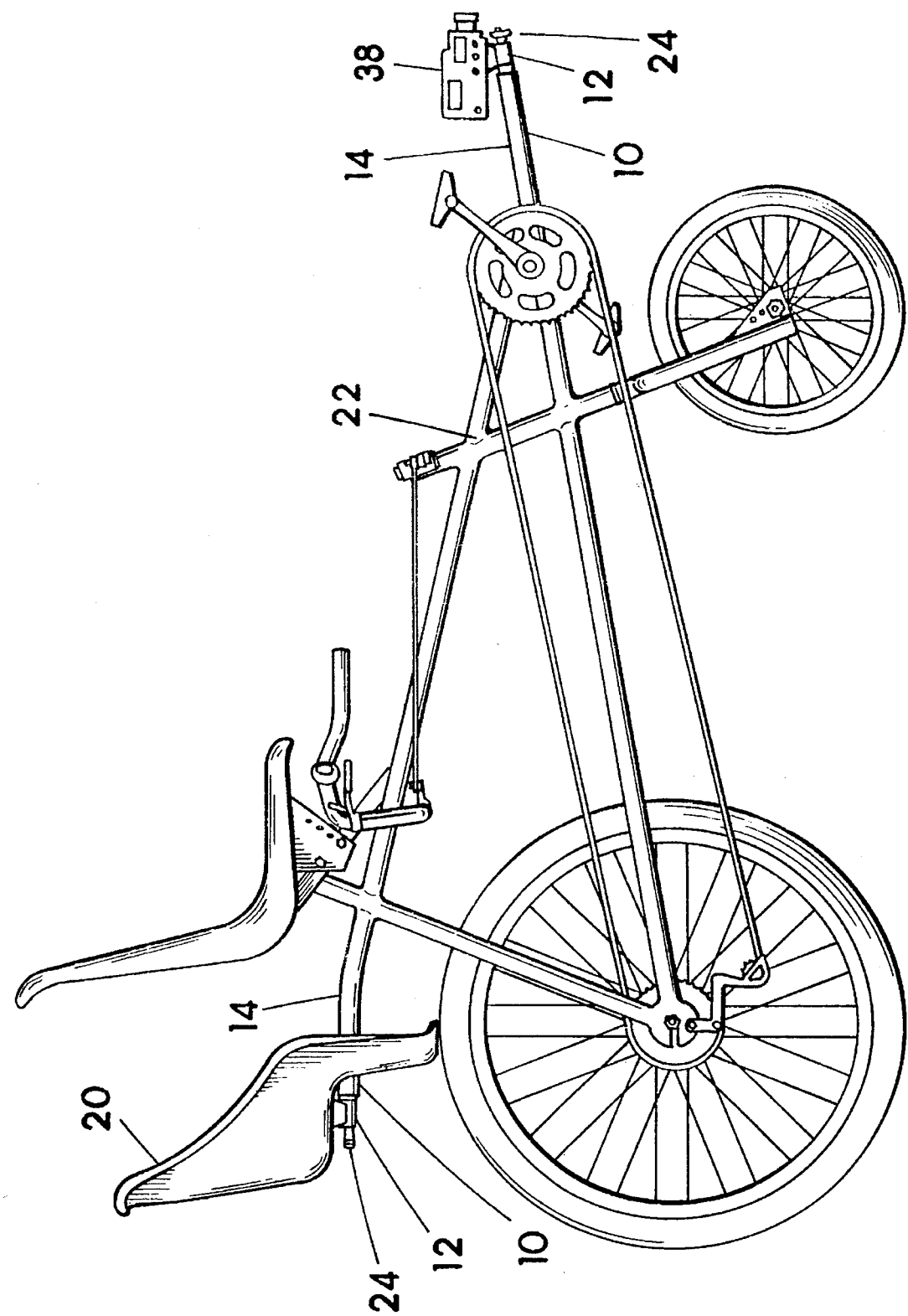
FIG. 1 is side view of a semi-recumbent bicycle of my designing shown for one example of a bicycle and equipped with both a front and rear accessory mount including extending support tubes supporting accessory items of different functional types each having second mount members or portions in accordance with the present invention. The front accessory mount is shown supporting a video camera as an accessory, and the rear accessory mount is shown supporting a child seat as an accessory.

With the Summary of the Invention and the above description of the drawings in mind, it should be appreciated by now that the invention may take numerous structural embodiments. All structural embodiments must be of adequate strength to meet the normal loading applied thereto, dependant upon the specific cargo being carried or expected to be carried in a particular application. In most applications, the first mount member 10 and second mount members 12 may be primarily manufactured of various types of steel, although aluminum, titanium, metal alloys, or carbon fibers and plastics will be acceptable in many cases for certain components dependant upon anticipated loading and weight restrictions. Additionally, combinations of materials may be utilized. For example, the supporting tube 14 may be made of steel for example, and the shaft 16 of the second mount member for certain accessories may be made primarily of plastics, and possibly integrally molded with the accessory attachment base 18 and accessory. In many applications, the accessory item such as a child seat 20 will be of molded plastics wherein the plastics are molded onto a metal shaft 16 of the second mount member 12 to securely attach the shaft 16 to the child seat 20, or the plastics of the child seat 20 may be molded to integrally form shaft 16 of the second mount member out of plastics. What is important is to provide adequate and safe strength utilizing any desirable materials and manufacturing techniques which are reasonably economical and durable. Furthermore, although the preferred support tubing 14 is shown round in the drawings, it could be square, rectangular, or oval tubing into (or over) which slips a portion of second mount member 12 which is of any corresponding shape and appropriate size. Furthermore, support tubing 14 could be defined to be the interior portion of the slip telescopic joint which would in that case most likely be a solid shaft, and a tubular shaft portion of second mount member (not shown) could slip over the exterior of support tubing 14 whether or not support tubing 14 was hollow and thus tubing, or solid and thus a shaft, or whether or not support tubing 14 is cylindrical, oval or rectangular. Additionally, if male and female interconnects are used, which is highly preferred, the male components could either be on the first mount member 10 or the second mount member 12, and the female component would be on the other or opposite interconnectable mount member or portion.

Furthermore, since few if any modern bicycle frames are made of rectangular tubing, being instead made of round tubing, and it is always important that a commercially feasible product such as the present invention be aesthetically pleasing, I prefer the use of round members and tubing for use as a component part of first mount member 10 since it appears to match the round tubing of a typical bicycle and thus appears more integrally formed therewith, although as mentioned above, rectangular or oval tubing will function within the scope of the invention.

Lock pin 24 which is preferably utilized as a component of the present multiple member mount to interlock first mount member 10 to second mount member 12 may be of a commercially available type which can be acquired from many suppliers in the U.S., with one supplier being Avibank MFG, Inc. of Burbank, Calif. Lock pin 24, although it may be varied somewhat from this description, includes an elongated outer shaft 26, a handle 28 at one end thereof; a push-button 30 at the handle end and centered within the handle 28, and spring ball detent 32 opposite the handle end on the side of the shaft 26. One or more spring ball detents 32 may be used on a single shaft 26. The shaft 26 is hollow, and includes an internal slidably retained shaft (not shown) connected at one end to the push button 30. As is well known, the opposite end of the internal shaft includes specifically shaped grooves containing a spring behind the balls 32 to push the balls outward. The outward position of the balls 32 on the backside of an item prevents the lock pin 24 from being withdrawn through a close fit bore. The specifically shaped grooves of the internal shaft are such that upon manually pushing on the button 30, the internal shaft moves forward wherein the balls 32 are allowed to retract into the outer shaft 26, and this allows retraction of the shaft 26 from a close fit diameter bore. An internal spring is arranged to extend the button 30, internal shaft and push the balls 32 outward automatically upon release of the button 30. Such lock pins 24 are in wide use and the mechanics thereof are well known and can vary slightly from one manufacturer to another. A transverse hole may be supplied in the button 30 of the lock pin 24 through which a padlock may be applied to prevent inward actuation of the button 30 and unauthorized withdrawal of the lock pin 24, which in the particular case might prevent the theft of an accessory item in accordance with the present invention; see FIG. 8.

As previously mentioned, a lock pin 24 is preferably utilized to secure the first and second mount members 10, 12 to one another via insertion of the lock pin 24 shaft through aligned main lengthwise bores 35 of the insert 36 of first mount member 10 and a bore 34 of shaft portion 16 of the second mount member 12, and in the particular examples of the invention shown in the drawings utilizing insert 36, the detent balls 32 move or spring outward beyond the diameter of the main bore 35 of insert 36 to engage against the backside of insert 36, or to position themselves (the balls 32) just beyond the backside of the insert 36 to prevent the lock pin 24 and any attached components, i.e., shaft 16, attachment base 18 and accessory item between the insert 36 and the handle 28 of the lock pin 24 from being withdrawn, pulled away or separated from insert 36 and first mount member 10 until button 30 is pushed inward.

Preferably lock pin 24 is fixed in shaft 16 using any suitable structuring such as friction fit, set-screws, welding, C-clips or integral structuring in manufacturing, and this provides the advantage of rendering the lock pin 24 difficult for the user to loose, and in this situation, each of the plurality of second mount members 12 includes a fixed in place lock pin 24. Lock pin 24 could be readily removable from shaft 16 within the scope of the invention, and a single lock pin 24 could be used with a plurality of accessories, being swapped from one accessory to the other as the accessories are interchanged on first mount member 10.

With reference specifically to the drawings wherein FIG. 1 is side view of a semi-recumbent bicycle 22 of my designing shown for just one example of a bicycle, and equipped with both a front and rear accessory mount on extending support tubes 14 supporting accessory items of different functional types each having second mount members 12 in accordance with the present invention. The front accessory mount is shown supporting a video camera 38 as an accessory, and the rear accessory mount is shown supporting a child seat 20 as an accessory. In the particular example shown in this drawing figure, the extending tubes 14 are welded components to the bike frame or from another view point, continuations of existing bike frame tube members defined during manufacturing of the semi-recumbent bike 22. In accordance with the present invention, the video camera 38 and the child seat 20 can be readily swapped in relative positions if desired.

Figure 2:
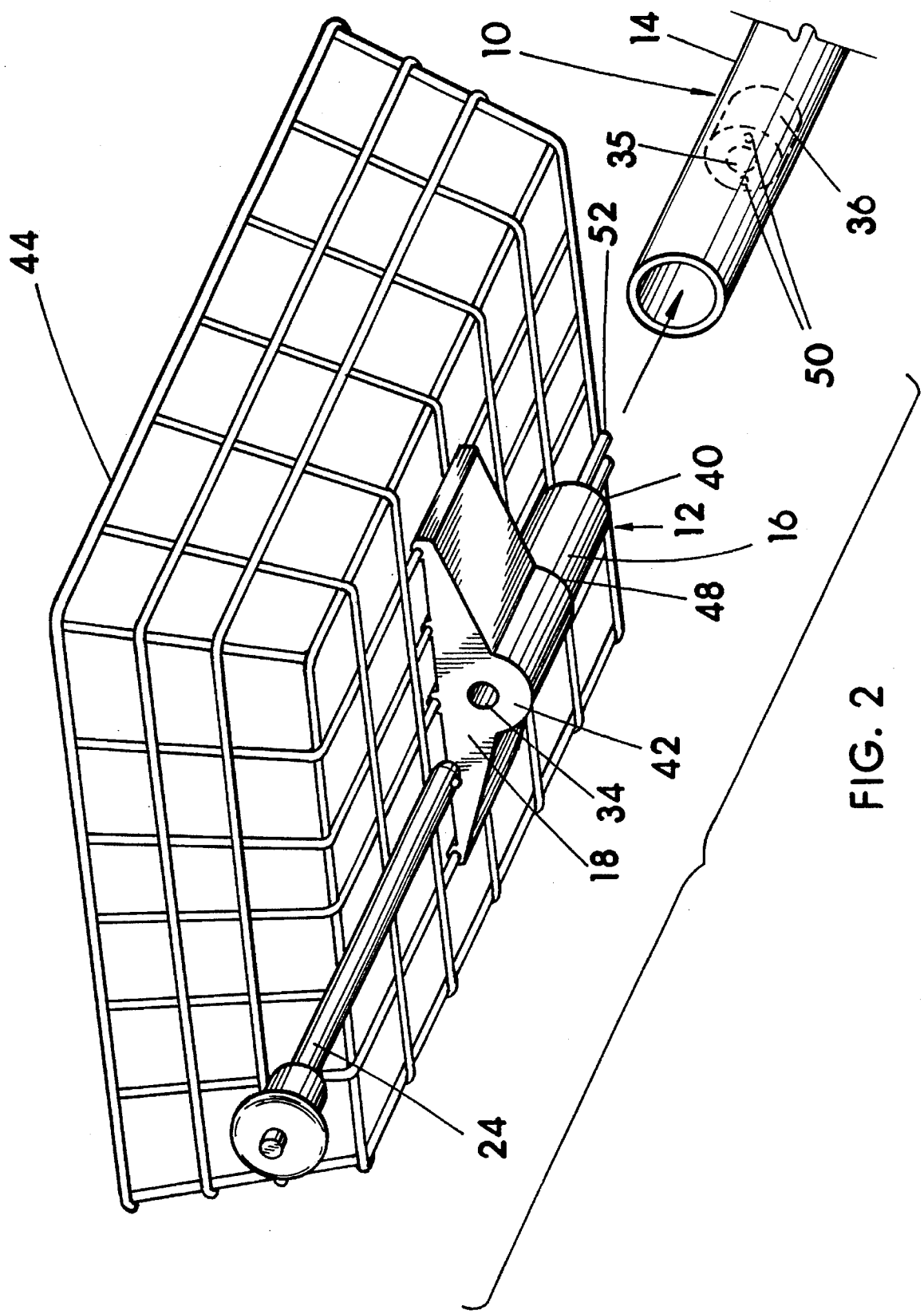
FIG. 2 illustrates a terminal end portion of the preferred support tube having one embodiment of cylindrical insert therein shown in dotted outline. The open ended tube and insert primarily define the first mount member. A cargo basket is shown as an example of an accessory, and specifically a cargo carrier accessory having a rigid attachment base connecting it to the outer portion of the cylindrical shaft component of the second mount member positioned for slip-in or telescopic engagement with the tube of the first mount member, followed by insertion of the shown lock pin having spring detents to interlock the first and second mount members. The lock pin is shown as a separate or separable item in this drawing for example, but it is preferably permanently affixed as part of the second mount member attached accessory. Two male extending pins are shown as part of the second mount member which insert into female recesses (two holes) in the insert within the tubing to provide positive registration and axial rotation prevention.
Figure 3:
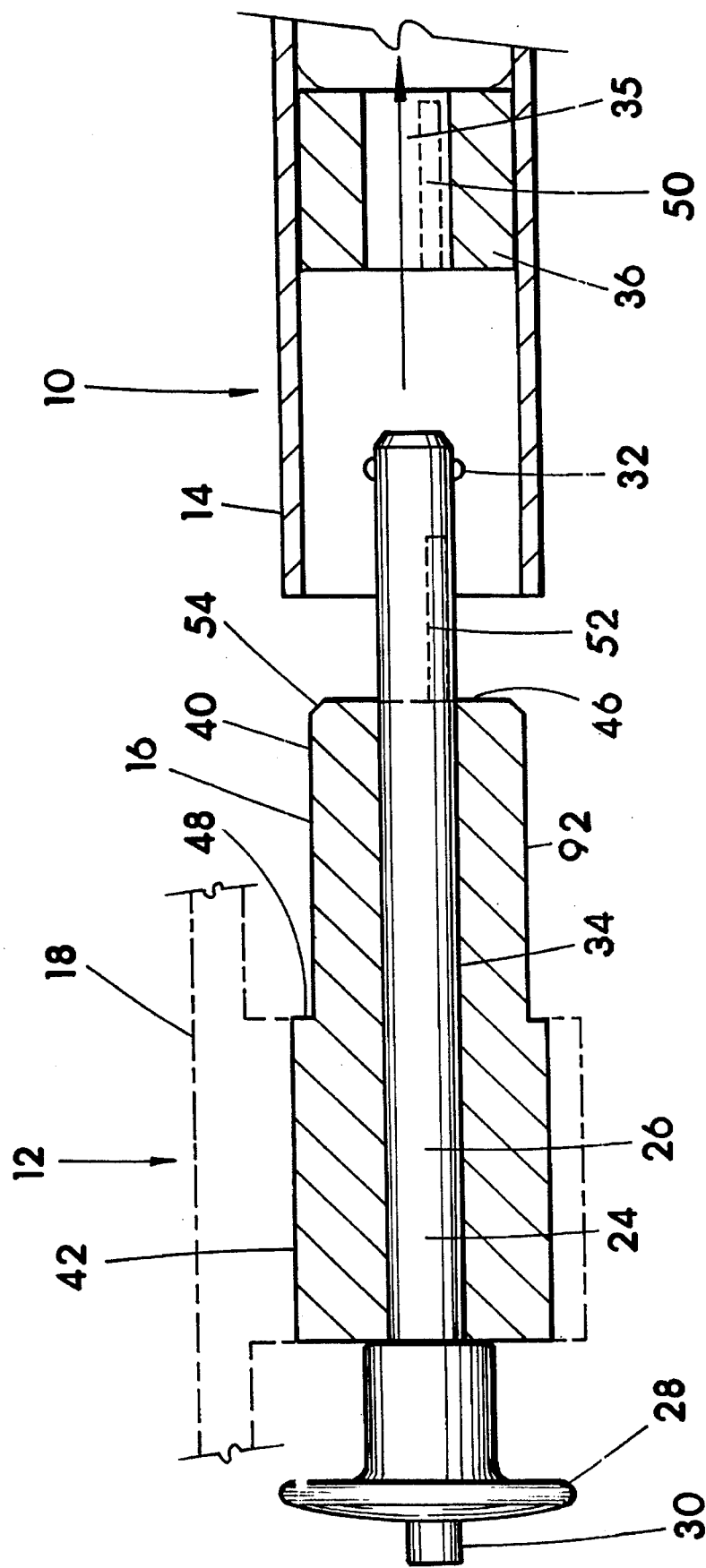
FIG. 3 is a partial cross sectional illustration showing the first and second mount members aligned for interconnecting. The lock pin is shown within the main bore of the second mount member, and in dotted lines is what would be rigid material defining supporting or attachment base structure for connecting an accessory such as the basket of FIG. 2 to the larger diametrical outer shaft portion of the second mount member.
Figure 5:
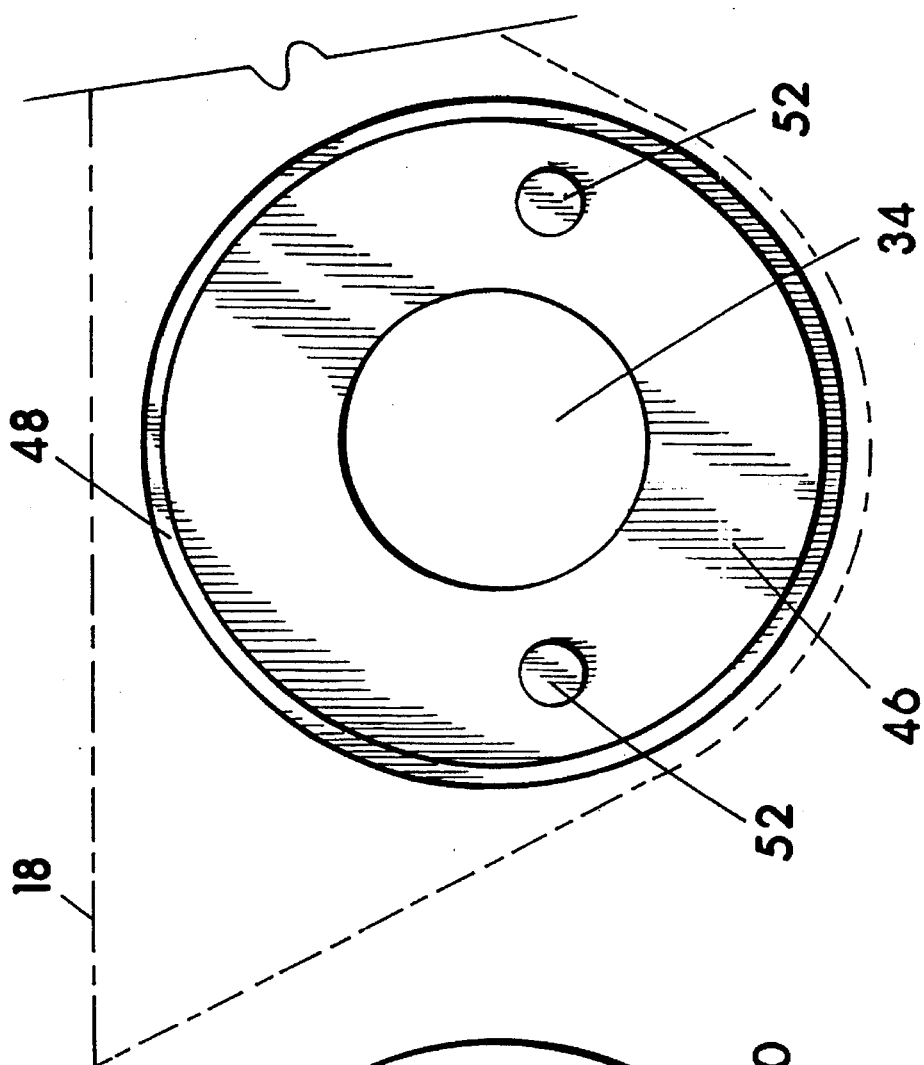
FIG. 5 is a front view or end of the second mount member which slidably fits inside the support tube of the first mount member. The shown structure is of the embodiment shown in FIG. 2, and essentially that of FIG. 3 only with the lock pin not shown. Two small extending pins which define the male component of the male/female interconnects to function with the holes of the insert of FIG. 5 are shown. The holes of FIG. 4 and pins of FIG. 5 are shown less than 180 degrees apart toward the bottom of the face, and this requires proper registration prior to the lock pin being fully engaged, which is long enough to reach and lock on the backside of the insert with the spring ball detents.
Figure 4:
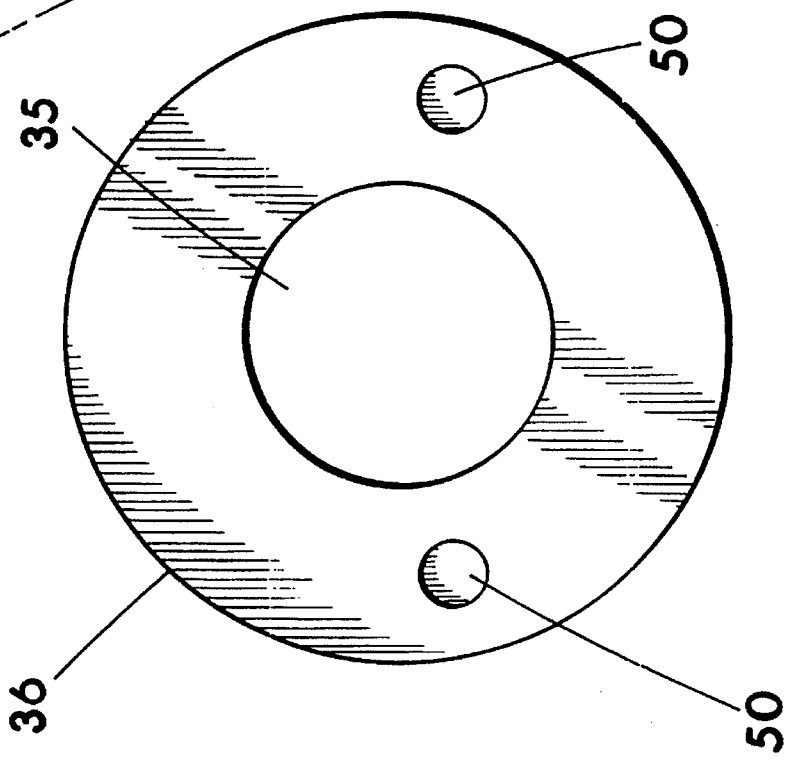
FIG. 4 is a front view of the insert embodiment of FIG. 2 which may be welded or otherwise securely attached within a supporting tube. Two small holes are shown on each side of the main bore. The small holes define the female component of male/female interconnects.

FIG. 2 is a perspective view which illustrates a terminal open end portion of the preferred support tube 14 having one embodiment of insert 36 shown in dotted outline, and recessed back somewhat from the open end to allow insertion of the front end 40 of shaft 16 into the tube 14. The insert 36, which is essentially a transverse wall spanning across the interior of tubing 14, should be rigidly secured and stationary within tube 14, and this may be accomplished via any suitable fastening arrangement such as welding, or set-screws through the outer wall of tube 14 into the annular outer surface of insert 36 for example. The use of set-screws would allow removal of insert 36 for servicing or replacement. Insert 36 should be made of a strong, durable and rigid material. Tube 14 and insert 36 primarily define the first mount member 10, although the end attaching tube 14 to the bike as well as any connected components for registration on or in tube 14 and or insert 36 are also considered a portion of the first mount member 10. First mount member is essentially all of the mount components remaining on the bike after disconnecting of the second mount member 12 and accessory therefrom. The opposite end of tube 14, not shown in the FIG. 2 drawing, is connected to a bike utilizing any suitable connection process and structure such as welding or clamping as may be ascertained from FIG. 1 and 10 for example. In FIG. 2, a cargo basket 44 is shown as an example of a cargo carrier accessory, and having a rigid attachment base 18 connecting between the bottom of the basket 44 and the outer exposed rear end 42 of shaft 16 of second mount member 12. The smaller diameter of shaft 16 portion, which is considered the front end 40, is shown positioned for slip-in or telescopic engagement with tube 14. Shaft 16 may be of a single diameter, since the maximum depth it can extend into tube 14 is or may be determined by the face 46 of shaft 16 abutting the opposing face of insert 36, or shaft 16 may be of multiple diameter, wherein the front end 40 is smaller than the rear end 42, and an abutment shoulder 48 for abutting against the end of tubing 14 is provided as may be best ascertained from FIG. 3. The use of the abutment shoulder 48 is preferred, as a small space of ⅛ inch or less for example only, between the face 46 of shaft 16 and the opposing face of insert 36 may be left after interlocking, with this small space providing space which debris and dirt might collect and not interfere with desired interlocking, as it should be appreciated that excessive dirt could prevent the detent ball 32 from reaching the backside of insert 36. The front end 40 or smaller end of shaft 16 should be sized to fit slidably yet snugly within tube 14, since tube 14 fitting snugly against and around shaft 16 provides a substantial stabilizing and strengthening effect. In FIG. 2, insert 36 is shown with two holes 50 being female components cooperative with two rigid male pins 52 extending from the terminal face 46 of shaft 16 insertable within holes 50 with proper alignment. The holes 50 and pins 52 prevent axial rotation of the second mount member 12 and attached accessory relative to the first mount member 10 and bike. The holes 50 and pins 52 additionally serve, when properly placed relative to the accessory as registration providing structure, wherein the basket 44 of FIG. 2 is readily applied horizontally. Upon proper registration of the male and female components (holes 50 and pins 52), front end 40 of shaft 16 may be fully inserted into tube 14 where it either abuts or comes into close proximity with insert 36, dependant upon use of the preferred shoulder 48 and the location thereof. With front end 40 of shaft 16 properly and fully inserted in tube 14, lock pin 24 may be applied through aligned bores 34, 35 in shaft 16 and insert 36. The reach or length of the ball 32 holding shaft portion of lock pin 24 beyond the terminal face 46 of shaft 16 should be just sufficient to allow the balls 32 to spring outward slightly beyond or at the backside of insert 36 at the point at which shaft 16 is fully and properly inserted into tube 14 and abutment shoulder 48 abuts the terminal end of tube 14. Preferably when balls 32 snap outward, the installer hears a snapping noise and feels a vibration from the snapping of the balls to provide him information indicating a completed interlock. Since a short portion of the lock pin shaft 26 extends beyond the ball 32 holding area, space behind insert 36 within tube 14 must be provided. Additionally, it is preferred that insert 36 is sufficiently recessed inward from the open terminal end of tubing 14 relative to the length of lock pin 24 and any male registration pins extending beyond face 46 of shaft 16, that front end portion 40 of shaft 16 may be partially inserted into tube 14 and thus able to hang there, being supported by tube 14 prior to aligning and partial engagement of male/female registration structure or the insertion of lock pin 24 into bore 35 of insert 36. This is to generally make interconnecting easier and possibly safer for the installer by alleviating the installer from having to support all of the weight while aligning registration structure. The aligning of the registration structure in this embodiment is accomplished via pressing inward on shaft 16 while rotating it and the accessory until the registration pins and holes align and full insertion is possible. As shown in FIGS. 2, 3–5, holes 50 and pins 52 are correspondingly placed on each side of bores 34, but are below center of the bores 35 to require that the second mount member 12 cannot be inverted during the process of interconnecting. FIG. 3 is a partial cross sectional illustration showing the first and second mount members 10, 12 aligned for interconnecting. The lock pin 24 is shown within the main bore 34 of the second mount member 12 wherein lock pin 24 is preferably permanently affixed and comprises a permanent portion of the second mount member 12; and in dotted lines is what would be rigid material defining supporting or attachment base 18 structure for connecting an accessory such as the basket 44 of FIG. 2 to the larger diametrical outer rear portion 42 of the shaft 16 of the second mount member 12. A chamfer or bevel 54 is shown on the terminal front edge of shaft 16 to allow easy starting of the shaft 16 into tube 14. A chamfer or bevel is also shown on the end of lock pin 24 near balls 32, and this is common on such pins for easy insertion. Also shown at 92 in FIG. 3 on front end 40 of shaft 16 is an area which as mentioned in the summary could be painted red or some other bright color which would serve as a signal of an incomplete interconnection when showing, and would signal a complete interconnection when hidden by tube 14. The bright color or some other suitable arrangement at 92 would serve to visually alert the installer of full or partial insertion of shaft 16 in tube 14.

Figure 6:
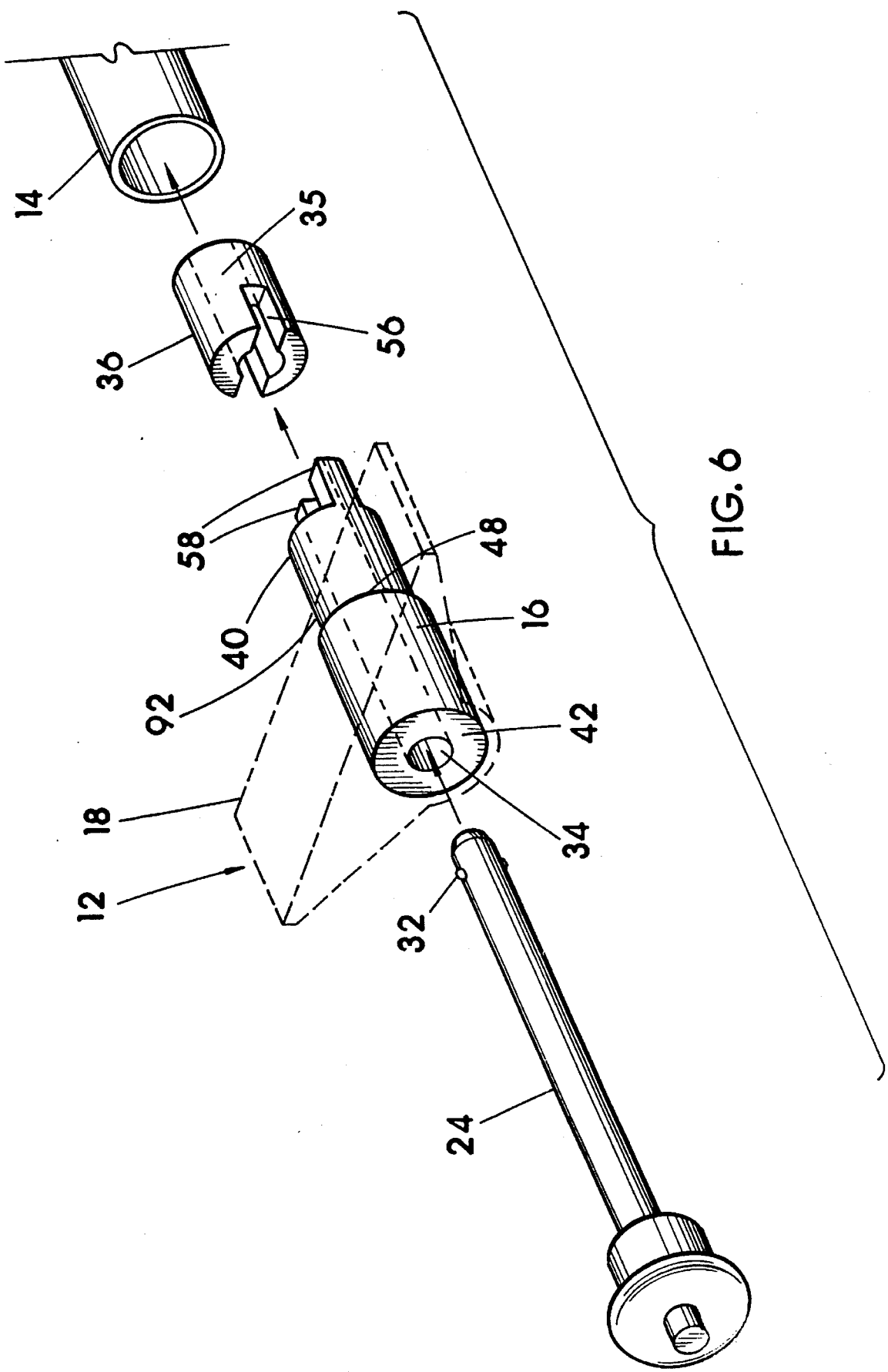
FIG. 6 is another possible structural arrangement of the first and second mount members wherein male/female interconnects are provided, and the lock pin as well as the support tube is still utilized. An accessory attachment base which could be utilized to attach many different accessories via bolting, welding or integral molding or casting therewith is indicated in dotted outline. The attachment base is shown on the larger diameter rear outer portion of the shaft of the second mount member, and a transitional shoulder useful for depth or penetration indexing is shown between the portion of the shaft which fits inside the tube, and the outer portion thereof which remains outside of the tube.

FIG. 6 is another possible structural arrangement of the first and second mount members or portions 10, 12 wherein male/female interconnects are provided, and the lock pin 24 as well as the support tube 14 is still utilized. An accessory attachment base 18 which could be utilized to attach many different accessories via bolting, welding or integral molding or casting therewith is indicated in dotted outline. The attachment base 18 is shown on the larger diameter rear portion 42 of shaft 16, and a transitional abutment shoulder 48 is shown between the front 40 and rear 42 portions of shaft 16. Abutment of shoulder 48 would occur slightly after full interconnection of the male and female registration and axial rotation prevention structuring. The male and female registration and axial rotation prevention structuring in the structural embodiment of FIG. 6 differs slightly from that shown in FIG. 2 and 3. In FIG. 6, the female component is a wide horizontal slot 56 in insert 36, and the male component is a pair of rectangular pins or keys 58 which will fit snugly in slot 58. This is from one view a tongue and groove arrangement. The "pair" of keys 58 is defined as two keys due to the bore 34 of shaft 16 passing therethrough. Insert 36 includes a bore 35 therein through slot 56.

Figure 7:
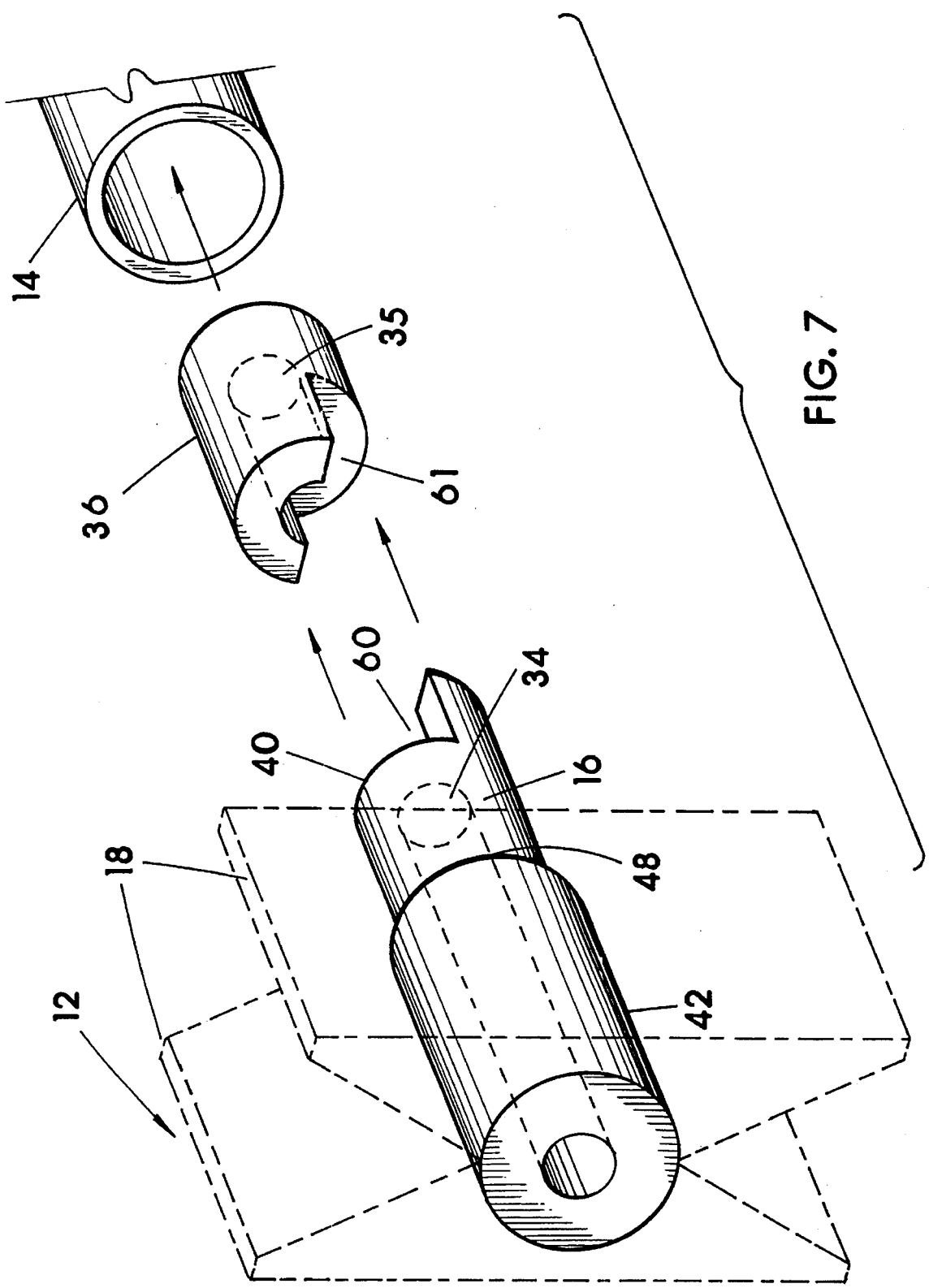
FIG. 7 is another possible structural arrangement of the first and second mount members wherein male/female interconnects are provided, and the lock pin as well as the support tube is still utilized.

FIG. 7 is another possible structural arrangement of the first and second mount members 10, 12 wherein male/female interconnects in the form of interconnectable notches 61 and 60 are provided. Notch 61 is provided on insert 36, and an oppositely disposed notch 60 is provided on the front end 40 of shaft 16. A bore 35 is provided through insert 36, and a bore 34 is provided through shaft 16 for receiving lock pin 24. Shown in dotted line is an attachment base 18 which would be more representative of one which could be used to mount two vertically disposed items such as advertizement signs, possibly one on each side of the rear bike wheel.

Figure 8:
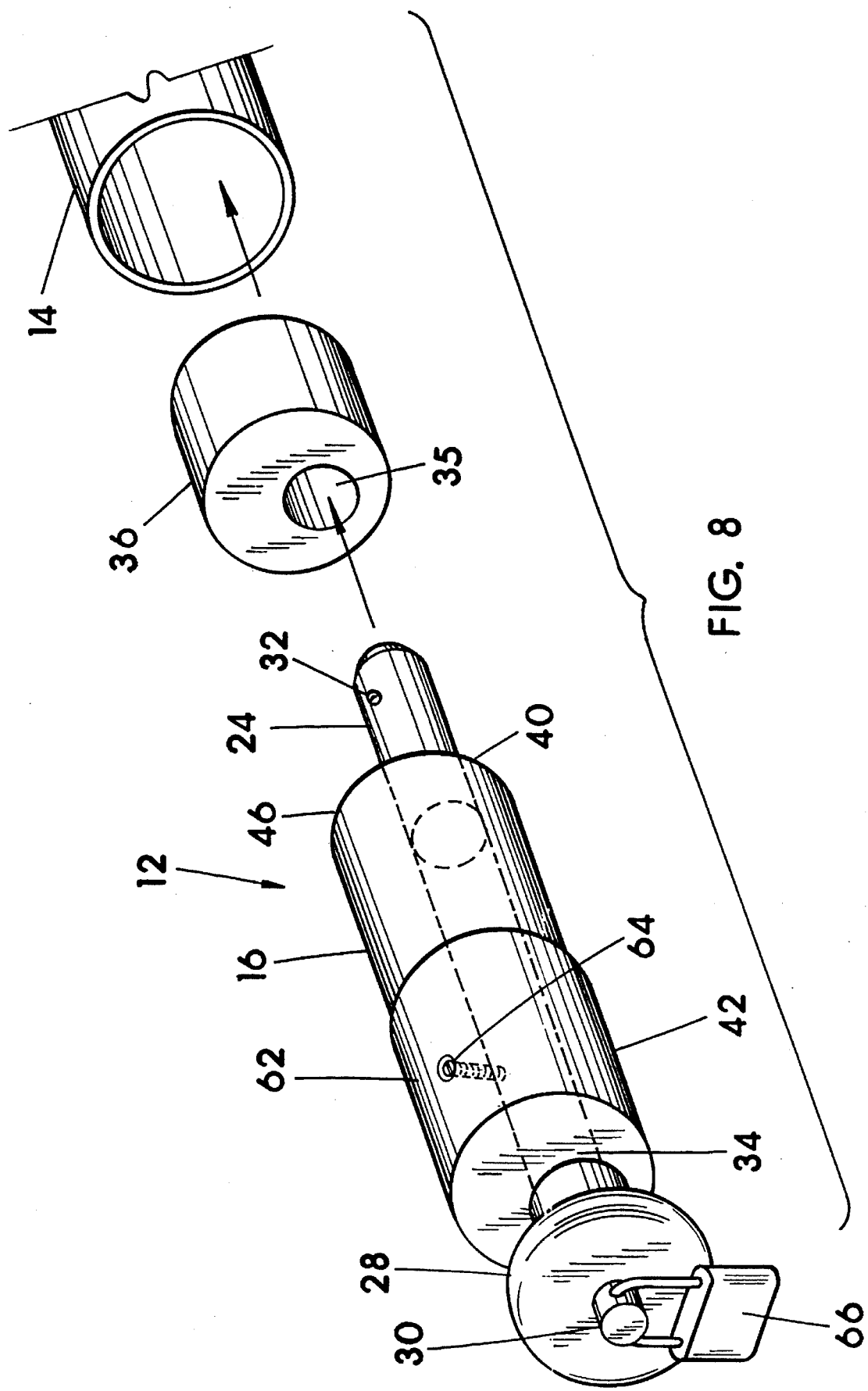
FIG. 8 is another structural arrangement of the first and second mount members wherein male/female interconnects are provided utilizing alignable off-center main bores, the lock pin, and the preferred support tube serving as male/female interconnecting registration structure as well as serving as main components of the interlock. In this simple yet highly effective embodiment, registration must occur prior to interlocking.

FIG. 8 is another structural arrangement of the first and second mount members 10, 12 wherein male/female interconnects are provided utilizing alignable off-center main bores 34, 35, the lock pin 24, and the preferred support tube 14 serving as male/female interconnecting registration structure as well as serving as main components of the anti-axial rotation and interlock. In this simple yet highly effective embodiment, registration must occur prior to interlocking. The main bore 35 in cylindrical insert 36 is positioned off-center, and the main bore 34 retains lock pin 24 in the cylindrical shaft 16 is correspondingly off-center, so that upon insertion of shaft 16 into tube 14, the terminal end of lock pin 24 near detent ball 32 will abut the face of insert 36, followed by the installer rotating the accessory and shaft 16 if needed to align lock pin 24 with the bore 35 of insert 36 followed by pressing the lock pin 24 through to interlock the first and second mount portions. The bore 35 in insert 36 and the position of lock pin 24 are vertically straight downward from top center 62 of shaft 16, the location at which an attachment base may be applied such as by welding or integral casting or molding. This structure of the FIG. 8 drawing relies on the off-center placement of lock pin 24 and bore 35 in insert 36 in combination with the tube 14 around front end 40 of shaft 16 for preventing axial rotation. Registration of an accessory can clearly be provided with this structure, depending upon the connected relationship of the accessory on the shaft 16 relative to the bore 35 and lock pin 24 positions. An accessory and accessory attachment base are not shown on shaft 16 in this illustration for the sake of clarity of that which is shown, and in view of the attachment bases 18 and accessories shown in the other included drawings. A flush or recessed set-screw 64 through a threaded bore in shaft 16 is shown as a structure useful for retaining lock pin 24 in shaft 16. Also shown is button 30 having a hole therethrough, and a padlock 66 applied through the hole as a security measure to prevent unauthorized removal of an accessory.

Figure 9:
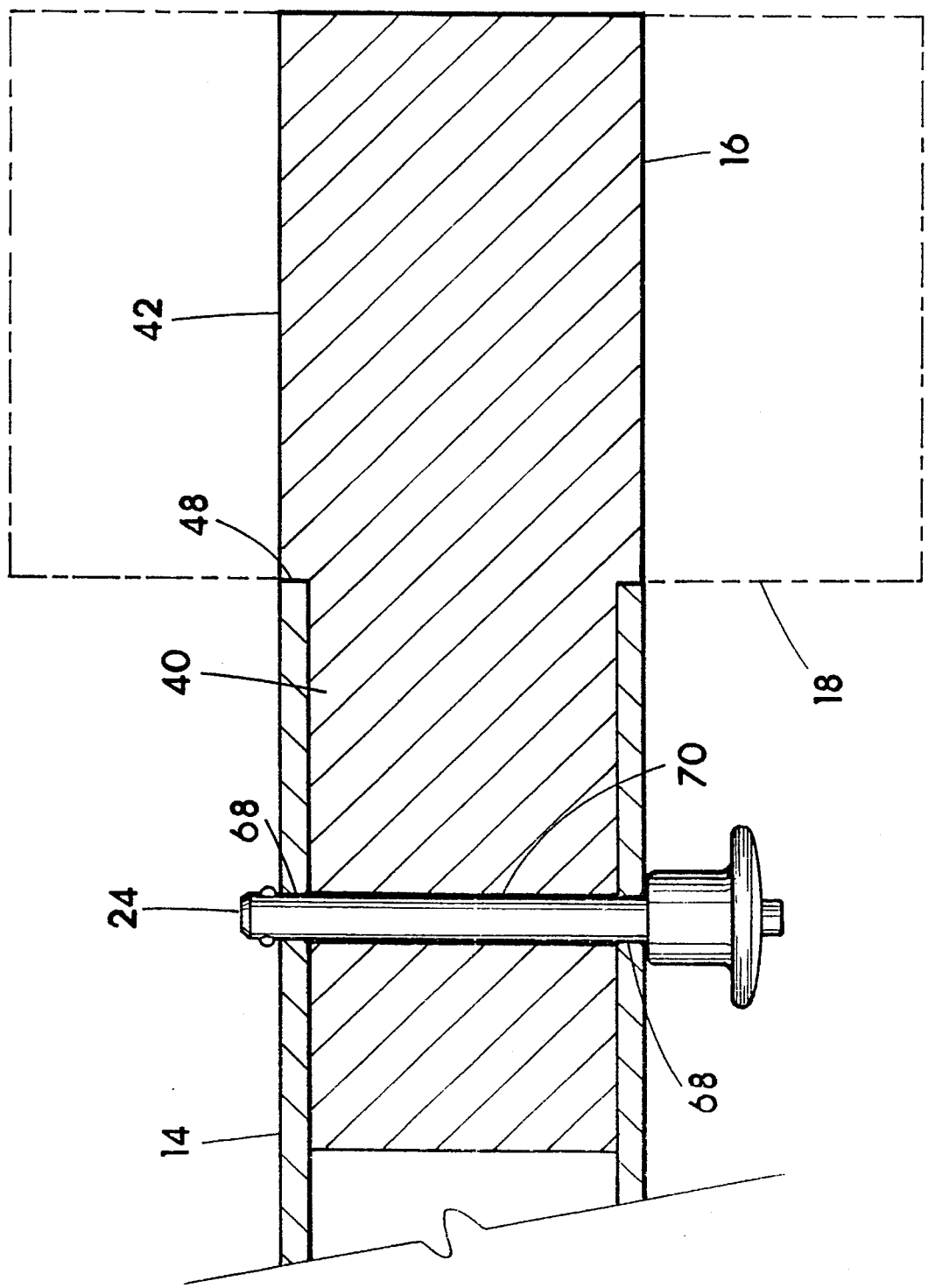
FIG. 9 is a very simple alternative structural arrangement of the invention showing the terminal end of a support tube in cross section and having a bore transversely therethrough defined by two aligned holes through the annular wall of the tube; a second mount member shaft in part inserted into the tube, the second mount member also having a transverse bore therethrough, and a lock pin inserted through the aligned transverse holes and bore. The second mount member shaft is shown with a shoulder to abut the terminal end of the tube to at least in part align via depth registration the two transverse holes/bores. A portion of the second mount member shaft is shown exposed beyond the tube whereat an accessory base attachment is indicated in dotted outline attached thereto.

FIG. 9 is a structural arrangement showing the terminal end of a support tube 14 in cross section and having a bore transversely therethrough defined by two aligned holes 68; a second mount member shaft 16 in part inserted into the tube 14, the front end 40 of the shaft 16 also having a transverse bore 70 therethrough, and a lock pin 24 inserted through the aligned transverse holes 68. The shaft 16 is shown with a shoulder 48 to abut the terminal end of the tube 14 to at least in part align the two transverse bores. The rear portion 42 of shaft 16 is shown exposed beyond the tube 14 whereat an accessory base attachment 18 is indicated in dotted outline attached thereto. The insertion of lock pin 24 as shown prevents axial rotation and separation of the first and second mount members. Lock pin 24 could in this particular arrangement be substituted with a spring biased cotter pin.

Figure 10:
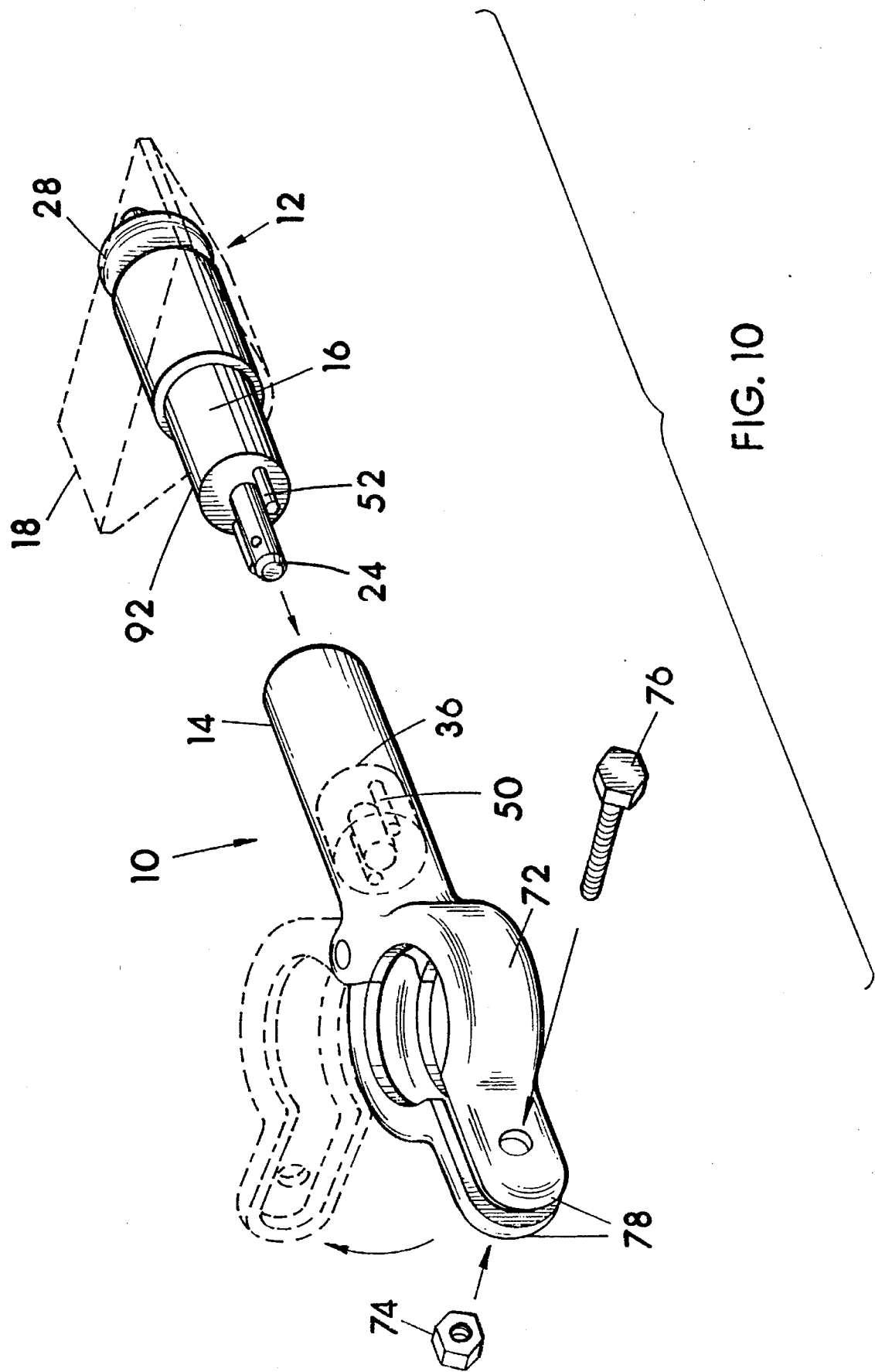
FIG. 10 is an illustration of a retrofit or add-on version in one feasible embodiment of the invention for attaching to an existing bicycle.
Figure 11:
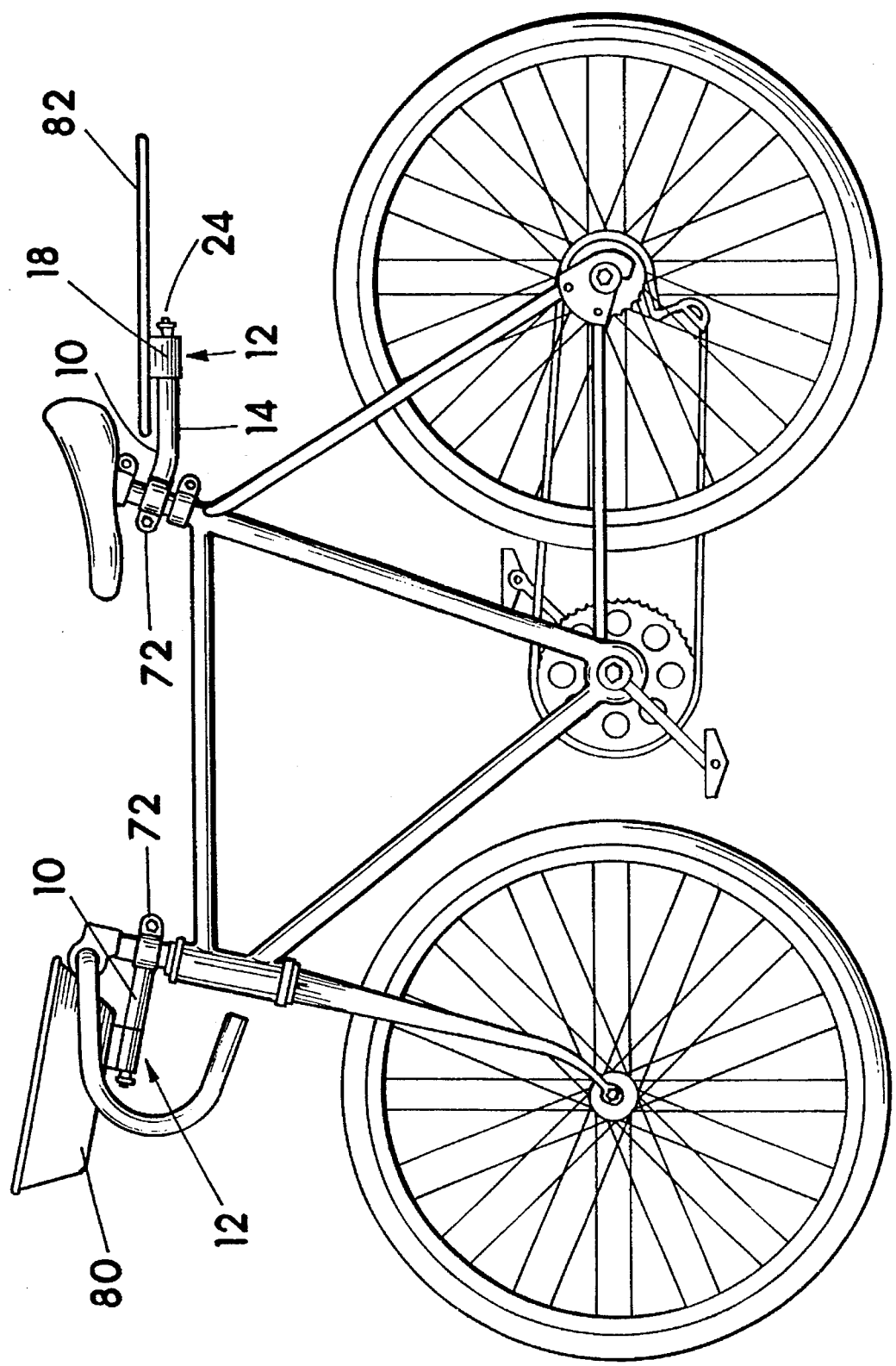
FIG. 11 shows a bicycle having two cargo carrier accessories attached thereto via the retrofit or add-on version of FIG. 10.

FIG. 10 is an illustration of a retrofit or add-on version in one possible embodiment of the invention for attaching to an existing bicycle. Shown is tube 14 having insert 36 therein, a pipe clamp structure 72 attached at the rear end of tube 14, and a second mount member 12 positioned for insertion in the open terminal end of tube 14. An accessory attachment base 18 is indicated in dotted line. The clamp 72 structure may utilize resilient materials which can be spread to snap around a frame member of the bike such as a steering stem or seat post as shown in FIG. 11, or any other frame structure of the bike. Alternatively as indicated in dotted line, the clamp 72 may include a pivoted side to hingidly open and be closed around a component of the bike. Both the resilient clamp and hinged clamp styles may be secured in place with a nut 74 and bolt 76 or like fasteners through aligned tabs 78 with holes. FIG. 11 shows a bicycle of a relatively common conventional type having two cargo carrier accessories attached thereto via the retrofit or add-on version of FIG. 10 having the clamps 72. On the bike in FIG. 11, the front multiple member mount is shown supporting a shallow cargo box 80, and the rear multiple member mount is shown supporting a flat cargo platform or rack 82. Additionally, the tube 14 of the rear multiple member mount is shown bent or angled near the seat post to illustrate that this is possible within the scope of the invention in order to keep the accessories from interfering with normal bike operation.

Figure 12:
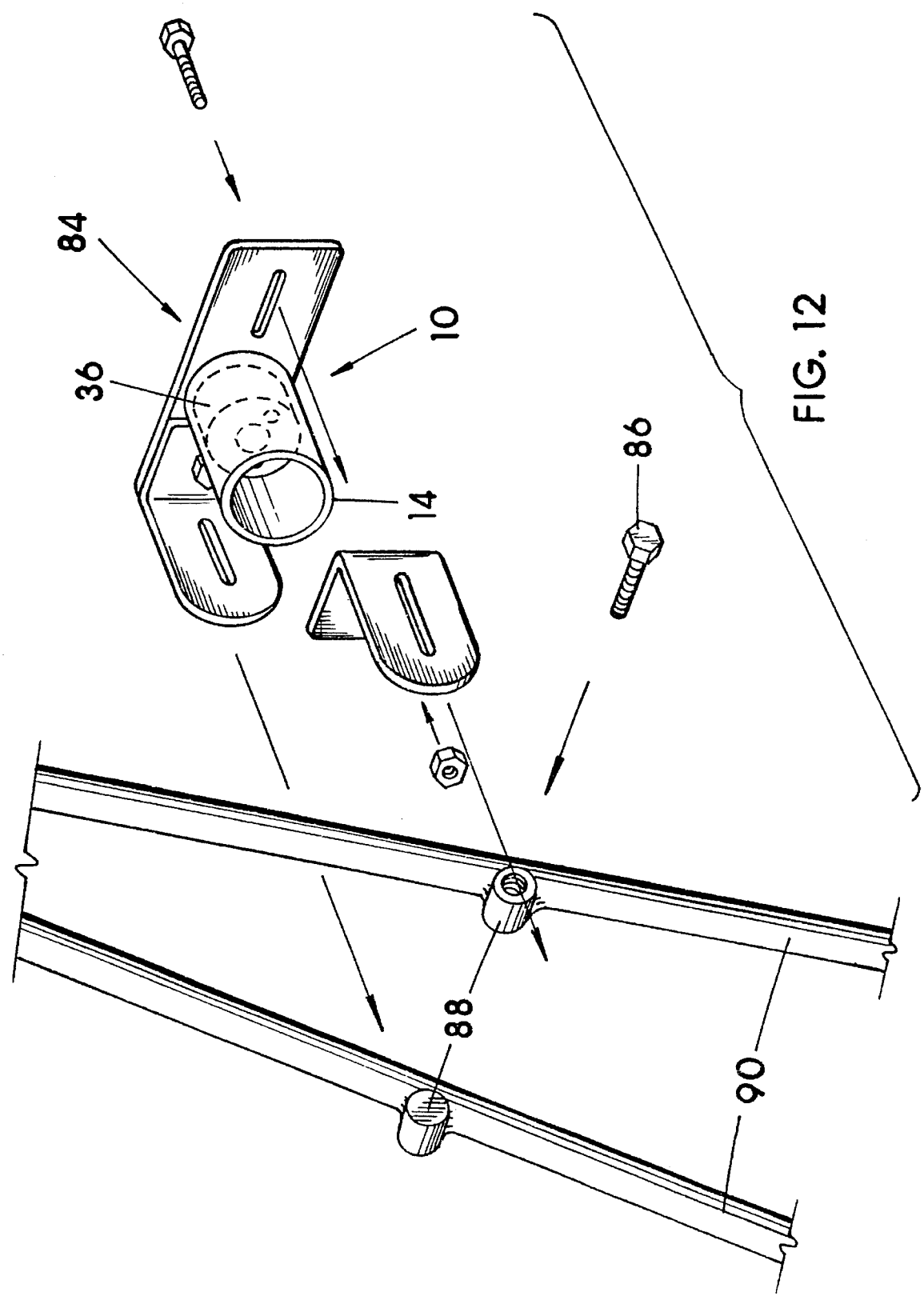
FIG. 12 is an illustration of a bracket and first mount member allowing the first mount member to be attached to a bike via threaded fasteners utilizing threaded bosses, the threaded bosses oftentimes affixed at the factory on the seat stays above the rear tire and below the seat of many bicycles for use to mount cargo racks supplied by the manufacturer of the bike. Since these attachment bosses are intended to be utilized to mount the rack supplied by the manufacturer of the bike, the bosses vary in spread or width from one bike manufacturer to another, therefore the bracket shown in FIG. 12 is a width adjustable bracket having centrally attached thereto a support tube having an insert defining an embodiment of the first mount member of the multiple member mount of the present invention.

FIG. 12 is an illustration of a bracket 84 and first mount member allowing the first mount member to be attached to a bike via threaded fasteners 86 utilizing threaded bosses 88, the threaded bosses 88 oftentimes affixed at the factory on the seat stays 90 above the rear tire and below the seat of many bicycles intended for use to mount cargo racks supplied by the manufacturer of the bike. Since these attachment bosses 88 are intended to be utilized to mount the rack supplied by the manufacturer of the bike, the bosses 88 vary in spread or width from one bike manufacturer to another, therefore the bracket 84 shown in FIG. 12 is a width adjustable bracket having centrally attached thereto a support tube 14 having an insert 36 defining an embodiment of the first mount member or portion of the multiple member mount of the present invention. The adjustability is provided via slots for bolts or screws to accommodate different widths between bosses 88, and differing seat stay 90 diameters, as the shown bracket mounts in part against the back side of the stays 90.

Although I have very specifically described the preferred structures and best mode of the invention, it should be understood that some changes in the specifics given may clearly be made without departing from the true scope of the invention in accordance with the appended claims.

What I claim as my invention is:

1. In combination, a multiple member mount assembly and a bicycle, the assembly comprising:

a first mount member attached to said bicycle and a second mount member disengageably attachable to said first mount member, said second mount member having an attached bicycle accessory, wherein the first and second mount members provide structuring allowing for the ready attachment and detachment of said accessory relative to said bicycle absent the use of wrenching tools;

said first mount member having a first end attached to said bicycle and a second end oppositely disposed from said first end, said second end structured for telescopic engagement;

said second mount member including a portion sized and shaped for a snug-fit, telescopic engagement with said second end of said first mount member;

bore means associated with at least one of said first or second mount members;

a lock pin insertable into said bore means when the first and second mount members are telescopically engaged with one another, said lock pin engages both said first mount member and said second mount member when inserted and including a lock means for preventing unwanted separation of the first and second mount members, said lock pin allows separation of said second mount member from said first mount member when removed from said bore means;

security lock means engagable with said lock pin for preventing unauthorized withdrawal of said lock pin from said bore means and unauthorized separation of said second mount member and said accessory from said first mount member.

2. In combination, a multiple member mount assembly and a bicycle, the assembly comprising: a first mount member attached to the bicycle and a second mount member having an attached bicycle accessory and disengageably attachable to said first mount member, wherein the first and second mount members provide structuring allowing for the ready attachment and detachment of said accessory relative to said bicycle absent the use of wrenching tools;

said first mount member including a support tube having a first end attached to said bicycle and a second end oppositely disposed from said first end, said second end including a wall defining a hollow with a terminal end opening;

said second mount member further including an exposed shaft sized and shaped for snug-fit insertion into said hollow through said terminal end opening of said support tube, wherein said wall surrounds a portion of said shaft and at least in part supports and stabilizes said shaft;

an insert-wall fixed transversely within said hollow of said support tube and recessed within said hollow inwardly away from said terminal end opening;

a main bore through said insert-wall aligned with and facing said terminal end opening of said hollow of said support tube;

a lock pin engaged with said shaft, said lock pin having an end portion extending from a terminal face of said shaft, the lock pin end portion sized and shaped relative to said main bore so that upon substantial insertion of said shaft into said hollow, said end portion of said lock pin inserts into said main bore;

at least one spring detent fixed on said end potion of said lock pin, said at least one spring detent being inwardly movable relative to said lock pin and insertable into said main bore when inwardly moved;

open means in association with said main bore for allowing said at least one spring detent to extend outward under spring pressure beyond a backside edge of said insert-wall upon substantial insertion of said end portion of said lock pin into said main bore whereby said at least one spring detent engages against said backside edge of said insert-wall to interlock said second mount member to said first mount member to prevent unwanted separation of the mount members from one another;

indexing and anti-rotation means including a first component associated with said first mount member, and a second component associated with said second mount member, said indexing and antirotation means arranged for interconnecting the first component and the second component with one another prior to interlocking of the first and second mount members to one anther, said indexing and anti-rotation means providing proper positioning of said accessory relative to said bicycle prior to occurrence of said interlocking, and preventing axial rotation of said second mount member relative to said first mount member when the first and second mount members are interlocked;

push button means attached to said lock pin and linked to said at least one spring detent for allowing manual pushing of an exposed button of said push button means to cause inward movement of said at least one spring detent so as to allow separation of said second mount member from said first mount member.

3. The combination according to claim 2, wherein said assembly further comprises a security lock means engaged with said push button means for preventing unauthorized actuation of said exposed button and unauthorized separation of said second mount member from said first mount member.

4. In combination, a multiple member mount assembly and a bicycle, said assembly comprising:

a first mount member attached to a bicycle and a second mount member having an attached cargo carrier bicycle accessory and disengageably attachable to said first mount member, wherein the first and second mount members provide structuring allowing for the ready attachment and detachment of said accessory relative to said bicycle;

said first mount member including a support tube having a fist end attached to said bicycle and a second end oppositely disposed from said first end, said second end including a wall defining a hollow with a terminal end opening;

said second mount member including an exposed shaft sized and shaped for snug-fit insertion into said hollow through said terminal end opening of said support tube, wherein said wall surrounds a portion of said shaft and at least in part supports and stabilizes said shaft;

an insert-wall fixed transversely within said hollow of said support tube and recessed within said hollow inwardly away from said terminal end opening;

a main bore through said insert-wall aligned with and facing said terminal end opening of said hollow;

a lock pin engage with said shaft for insertion into said main bore, said lock pin having an end potion extending from a terminal face of said shaft, the lock pin end portion sized and shaped relative to said main bore for subsequent substantial insertion of said shaft into said hollow prior to insertion of said end portion of said lock pin into said main bore and provides for partial support of said second mount member and attached accessory by said first mount member prior to insertion of the lock pin end portion into said main bore;

at least one spring detent fixed on said end portion of said lock pin, said at least one spring detent being inwardly moveable relative to said lock pin and insertable into said main bore when inwardly moved;

open means in association with said main bore for allowing said at least one spring detent to extend outward under spring pressure beyond a backside edge of said insert-wall upon substantial insertion of said end portion of said lock pin into said main bore whereby said at least one spring detent engages against said backside edge of said insert-wall to interlock said second mount member to said first mount member to prevent unwanted separation of the mount members from one another;

indexing and anti-rotation means including a first component associated with said first mount member, and a second component associated with said second mount member, said indexing and antirotation means including a male component means and a cooperative female component means sized and shaped relative to one another and positionally arranged for interconnecting the first component and the second component with one another prior to the interlocking of the first and second mount members to one another, said indexing and anti-rotation means providing proper positioning of said accessory relative to said bicycle and preventing axial rotation of said second mount member relative to said first mount member when the first and second mount members are interlocked;

push button means attached to said lock pin and linked to said at least one spring detent for allowing manual pushing an exposed button of said push button means to cause inward movement of said at least one spring detent so as to allow separation of said second mount member from said first mount member.

5. The combination according to claim 4, wherein said assembly further comprises a security lock means engaged with said push button means for preventing unauthorized actuation of said exposed button and unauthorized separation of said second mount member from said first mount member.

* * * * *